May 26, 1964   H. C. KUYKENDALL   3,134,410
MECHANISM FOR FORMING TAPERED HOLES IN BARRELS
Filed March 13, 1962                              2 Sheets-Sheet 1
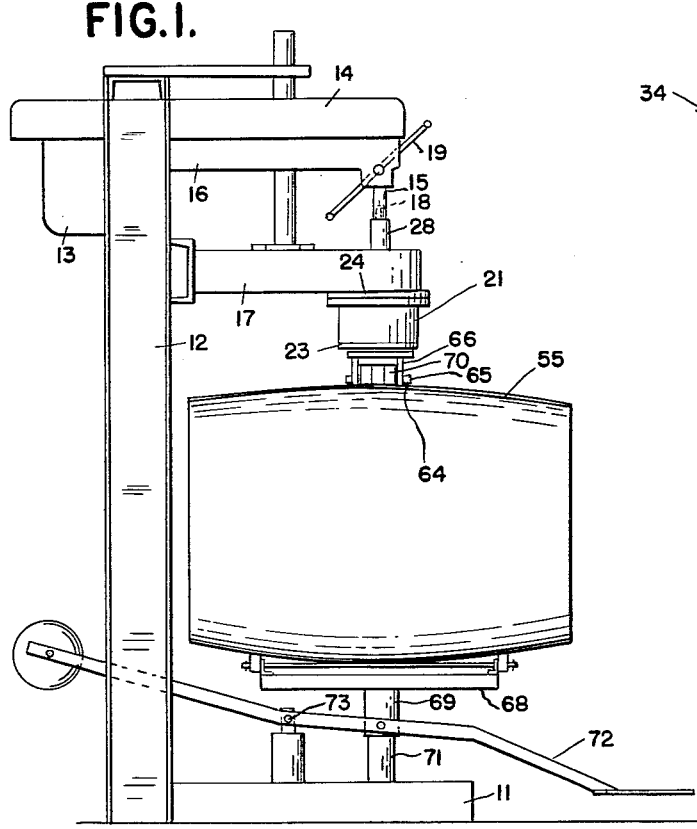
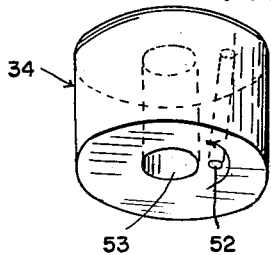
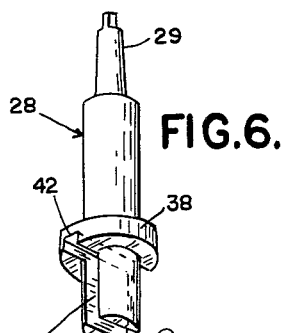
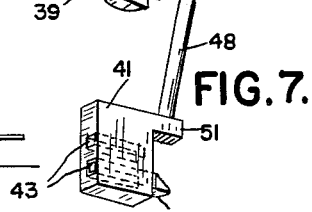
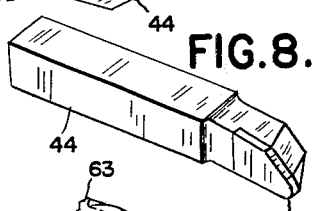
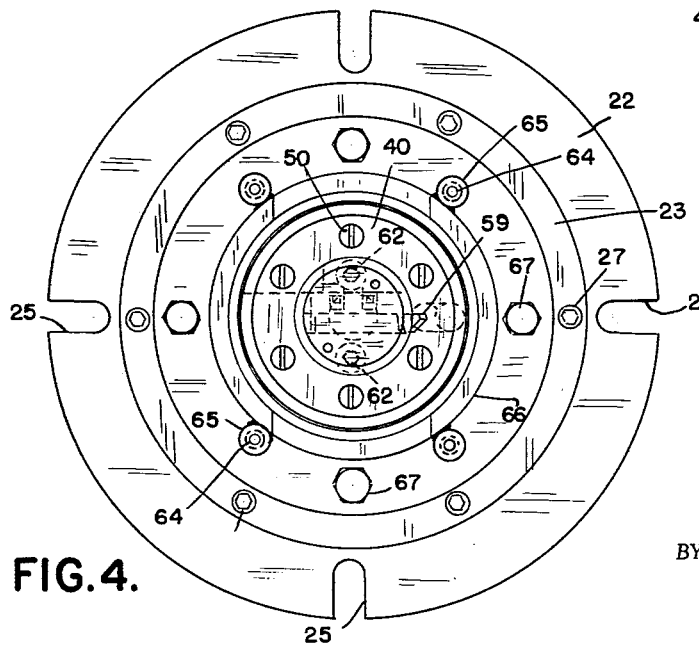
INVENTOR.
HAROLD C. KUYKENDALL
BY Arthur H. Stuart
ATTORNEY

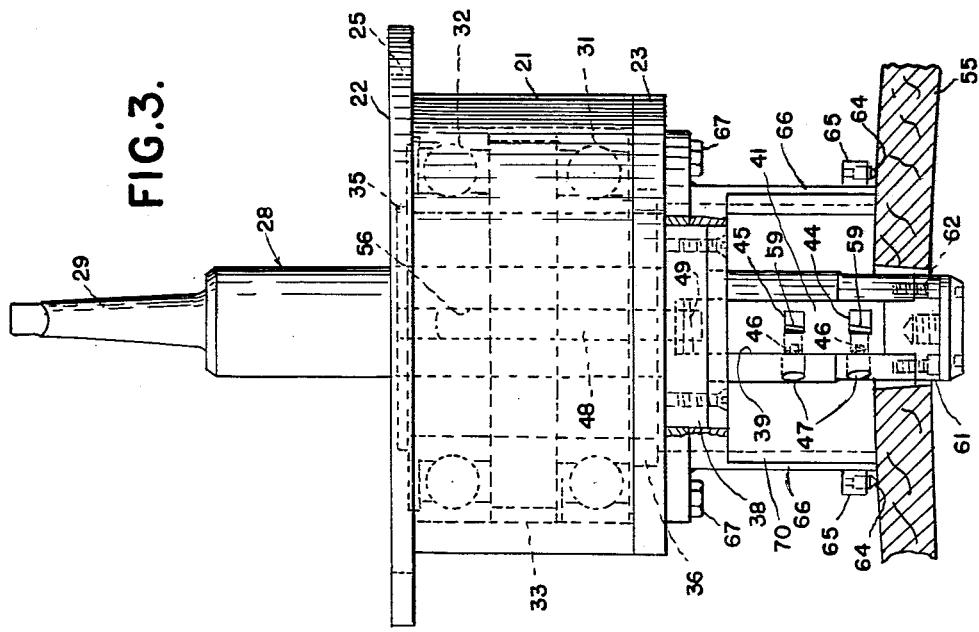

ated May 26, 1964

3,134,410
MECHANISM FOR FORMING TAPERED HOLES
IN BARRELS
Harold Charles Kuykendall, Peoria, Ill., assignor to
Hiram Walker & Sons, Inc., Peoria, Ill.
Filed Mar. 13, 1962, Ser. No. 179,441
5 Claims. (Cl. 144—93)

This invention relates to an improved mechanism for producing tapered holes in barrels such as whiskey barrels, beer barrels and the like in such manner that the sides of the finished tapered hole will be of true circular contour, and tapered to a predetermined angle to insure a perfect and tight fit with a round bung or stopper.

Heretofore in cutting bungholes in whiskey barrels, for example, it has been the practice to bore the hole with an augur, followed by a reaming operation which produces the finished tapered hole for a bung or stopper. This practice does not provide a perfectly circular hole but rather one which is slightly elliptical in shape. This is due to the fact that the knife edge of the traditional reamer presents a working edge of considerable width. The cutting force at this working edge varies as the reamer rotates, alternately cutting across and with the grain of the wood. This tends to produce a hole somewhat elliptical in contour in contrast to a hole of true circular contour. A round bung or stopper driven into a bunghole of such shape obviously does not provide a tight seal. This is particularly undesirable in the case of whiskey barrels especially because distillers are starting to use a system of palletized storing of barrels in the warehouse. In this system the barrels instead of being placed on their sides on the storage racks, with the bunghole facing upwardly, are stacked endwise on top of one another on pallets. Since the bunghole is ordinarily placed in the side of the barrel, this vertical stacking of the barrels end on end causes considerable pressure at the bung with consequent danger of leakage unless a tight seal is provided.

I have found this tendency to form an elliptically shaped bunghole by use of the traditional reamer can be overcome by using a cutter having a single blade or cutting element which is shaped to substantially a point to provide a narrow working edge. The cutting force at the working edge of such a pointed tool is considerably less than that present at the knife edge of the traditional reamer. Because of this the variation in the cutting edge force when the blade is cutting with the grain, compared to when it is cutting against the grain, is much less than with the traditional reamer, thus virtually eliminating the tendency to produce an elliptical hole.

The use of such a narrow-edged cutter necessarily entails the provision of means for moving the cutter blade inwardly as it goes into and through the barrel stock in order to give the desired taper to the sides of the bunghole. My invention includes means for producing such movement of the blade to provide a predetermined angle of taper to the sides of the bunghole.

In the accompanying drawings I have shown a preferred embodiment of mechanism constructed in accordance with my invention.

Referring to the drawings:

FIG. 1 is a side elevational view showing the general arrangement of the parts of a machine embodying the invention;

FIG. 2 is an enlarged elevational view, partly in section, showing the relative position of the parts at the beginning of the reboring operation;

FIG. 3 is an elevational view of the parts shown in FIG. 2 but taken at right angles thereto;

FIG. 4 is a bottom plan view taken as indicated by lines 4—4 of FIG. 2; and

FIGS. 5, 6, 7, 8 and 9 are enlarged views showing respectively, in disassembled position, the guide bushing for the reboring spindle, the reboring spindle; the tool holder and cutter, an enlarged view of the cutter, and the barrel-locating knob carried on the lower end of the reboring spindle.

The reboring mechanism illustrated in the drawings is intended to be driven by a standard drill press which may be either hand feed or automatic feed, the one shown being of the hand feed type. The press frame includes a base 11, an upright 12 which provides support for a motor 13. A belt drive contained within a housing 14 transmits power from the motor 13 to a vertically disposed drive shaft 15 journalled in a transverse frame member 16. The lower end of shaft 15 is recessed as indicated at 18 to provide a half coupling. Shaft 15 is raised and lowered by a hand feed 19. Inasmuch as these parts are conventional and form no part of the invention they will not be described in further detail.

Considering particularly FIG. 2, the reboring mechanism is supported on a transverse frame member 17 by an outer housing 21 closed at its upper end by a plate 22 and at its lower end by a plate 23, plate 22 being removably secured to a plate 24 (FIG. 1) on frame member 17 by bolts (not shown) which engage in slots 25 formed in plate 22. Housing 21 is secured to plate 22 by bolts 26 and bottom plate 23 is secured to housing 21 by bolts 27.

A reboring spindle or shaft 28 extends vertically through housing 21 and terminates at its upper end in a half coupling 29 which mates with the half coupling 18 to provide a drive connection with shaft 15 through to the motor 13. The spindle 28 is rotatably supported in housing 21 and is also moveable vertically therein by the hand feed 19. Such mounting is provided by ball bearings 31 and 32 fitted snugly in the housing 21 and spaced from one another by an inwardly projecting flange 33 forming part of the housing 21. Interposed between spindle 28 and bearings 31 and 32 is a guide bushing 34 which rotates with the inner races of bearings 31 and 32 but is held against vertical movement by the provision at its upper end of a flange 35 which forms a shoulder extending over bearing 32. This flange fits into a centrally recessed portion in top plate 22 as shown in FIGS. 2 and 3. An oil seal 36 is interposed between the lower edge of bushing 34 and bottom plate 23, clearance space 37 being provided between the inner race of bearing 31, seal 36, and plate 23.

The lower end of spindle 28 is shaped with a flange 38 (FIG. 6) and the portion of the spindle below this flange is bifurcated as indicated at 39 to receive a tool holder 41 (FIG. 7). The under face of flange 38 is recessed to provide a channel or slot 42 to receive the upper end of tool holder 41 thus permitting transverse movement of the tool holder 41 in slot 42. Tool holder 41 is provided with square-shaped transversely disposed openings for receiving the cutters. In the embodiment shown two such openings 43 are provided with a cutter 44 shown in position in the lower opening 43. A similar cutter 45 can be mounted in upper opening 43 as shown in FIG. 2. These cutters are adjustably secured in position in tool holder 41 by set screws 46 which are accessible through openings 47 in spindle 28.

The tool holder 41 is moved transversely in slot 42 and the bifurcated portion of spindle 28 upon vertical movement of the latter. This is accomplished by a guide rod 48 which is pivotally connected by a pin 49 (FIG. 2) to a laterally projecting lug 51 on tool holder 41. The guide rod 48 is received in a guide slot 52 (FIG. 5) which extends through guide bushing 34 at an angle from the axis of said bushing, this angle of incline being fixed in accordance with the angle to which it is desired to taper the sides of the bunghole. The portion of spindle 28 immediately above flange 38 is cylindrical in shape and has a sliding fit in the cylindrical opening 53 which extends axially through guide bushing 34. In the assembled position of the parts shown in FIG. 2 it will be observed how tool holder 41 fits up into the bifurcated lower end of spindle 28 with guide rod 48 extending through guide slot 52 in guide bushing 34. A retaining plate 40, connected by screws 50 to the flange 38, holds the tool holder 41 in place on spindle 28 and assures proper sliding clearance with flange 38. Bearing in mind that guide bushing 34 rotates with spindle 28, but is held against a vertical movement by the housing, it will be apparent that as spindle 28 is fed downwardly from the position shown in FIG. 2 into a hole 54 formed in a barrel 55 guide rod 48 will move tool holder 41 and cutters 44 and 45 transversely to the left, viewing FIG. 2, by reason of the inclination in guide slot 52. Furthermore this movement of cutters 44 and 45 will be at a constant rate relative to the rate of a downward movement of spindle 28 inasmuch as guide rod 48 is in the form of a straight rod and is guided by the straight guide slot 52. Thus, as the cutter bars move downwardly they will move inwardly, to the left viewing FIG. 2, in a line parallel to the axial line of guide slot 52. Accordingly, the angle of guide slot 52 relative to the axial line of spindle 28 determines the angle of inward taper which is cut in the barrel stock by cutters 44 and 45. This angle can be fixed as desired but normally would be about 5 degrees from the vertical. To provide clearance between guide rod 48 and spindle 28 as these parts move downwardly, a slot 56 (FIG. 2) is provided in spindle 28 to permit lateral inward movement of tool holder 41.

In accordance with my invention, the cutter bar 44, an enlarged view of which is shown in FIG. 8, is shaped to provide a narrow, virtually pointed tip 59 which provides a narrow working edge as compared to the long cutting edge of the traditional reamer. With such a pointed cutter very little resistance is offered by the wood as the cutter is lowered through the bunghole. Thus there is little or no variation in the resistance offered to the cutting edge when the edge is moving against the grain of the wood compared to when it is moving with the grain of the wood. This eliminates the tendency to form an elliptical opening rather than a true circular opening, which, as previously explained, occurs in the use of a traditional reamer because of the greater bite into the wood which the reamer makes as it goes into the grain compared to the bite which it takes when it is moving with the grain. Thus I am able to provide a cutter which will shape the sides of the bunghole to a true circle and to a true predetermined angle of taper through the provision of the means described for moving the cutter inwardly as it moves downwardly under the directional control of guide slot 52. The cutter tip 59 is preferably made of stellite or other suitable hard material.

The lower end of spindle 28 carries a barrel locating knob 61 which is shown in perspective in FIG. 9. This knob is shaped to engage the hole 54 which has previously been bored in the barrel and is secured to the lower end of the spindle by screws 62. A key flange 63 extends across the top of the knob 61 and engages in the slot formed in the bifurcated lower end of spindle 28.

Suitable means is provided for gripping the barrel and holding it in position for reboring. In the embodiment shown the means for gripping the barrel comprises a series of four holding pins 64 which are carried by lugs 65 carried at the lower end of a sleeve or housing 66 which is secured by bolts 67 to lower housing plate 23. The pins 64 are pointed and bite into the wood to grip the barrel when it is moved into the boring position shown in FIG. 3. The front half of the lower sleeve portion of the gripping mechanism has been omitted from FIG. 2 to permit a clear showing of the arrangement of the cutter bars. Two diagonally disposed portions of the housing 66 are cut away to provide the large openings 70 (FIGS. 1 and 3) through which the lower end of the cutter may be viewed, and through which shavings may pass.

The means shown in the drawing for moving the barrel into position to be gripped by the pins 64 and to hold it in that position during the reboring operation, comprises a saddle or rack 68 (FIG. 1) supported on a sleeve 69 which is slidably supported on a guide shaft 71. A counter balanced foot treadle 72 connected with sleeve 69 and pivoted on a shaft 73 provides means for raising and lowering saddle 68 to move the barrel 55 into engagement with the gripping pins 64 and to hold the barrel in position for reboring. Other conventional means, as desired, may be provided for positioning and holding the barrel.

It is believed that the operation of the mechanism will be understood from the foregoing description. In brief, the barrel 55, which has already had a hole 54 bored therein, is rolled onto the saddle 68 with the barrel positioned so that the hole 54 is in approximate line with the locating knob 61. The foot treadle 72 is then released to raise the barrel so that locating knob 61 will move into the hole 54. A very slight upward movement brings the barrel into the position of FIGS. 2 and 3 with the gripper pins 64 biting into the face of the barrel. Spindle 28 is then lowered by the hand feed 19 and as it moves downwardly cutter 44 under its rotational movement cuts downwardly through hole 54 and in doing so moves inwardly to the left, viewing FIG. 2, tapering the sides of the hole to an angle to the vertical corresponding to the vertical angle of guide slot 52. Normally cutter 44 will produce the finished tapered hole, but if a particular barrel has a hole of such size that cutter 44 cannot produce a satisfactory hole, the spindle is fed further into the barrel enabling the second cutter 45, which is set a bit outwardly from cutter 44, to produce a larger bunghole which will be tapered to the same angle as that produced by the first cutter 44. After the cutting has been completed, the boring mechanism is raised from the barrel by hand feed 19, foot treadle 72 is depressed to lower the barrel and to permit its removal from the supporting saddle 68.

Although the invention has been described in connection with the details of a specific embodiment it is to be understood that these details are not to be regarded as limitations upon the scope of the invention except insofar as included in the accompanying claims.

I claim:

1. Mechanism for reboring holes in barrels and other containers comprising a stationary supporting housing, a guide bushing journalled for rotational movement in said housing, means for holding said bushing against axial movement in said housing, a spindle extending through said bushing and housing and moveable axially therein, one end of said spindle having means for connecting with a drive shaft, a cutter mounted on said spindle and moveable transversely thereof, said cutter having a blade shaped substantially to a point to provide a narrow cutting edge, whereby to minimize the variation in cutting force when cutting with and then against the grain of the stock, means carried on the outer end of said spindle and beyond the cutter for locating a barrel in reboring position by engaging the hole to be rebored, and means controlled by said guide bushing and operable upon axial movement of the spindle toward the barrel to move the cutter blade inwardly at a constant rate relative to its rate of movement in the axial direction of the spindle to form a true circular bunghole with sides tapered inwardly at a predetermined angle.

2. Mechanism for reboring holes in barrels and other containers comprising a stationary supporting housing, a guide bushing journalled for rotational movement in said housing, means for holding said bushing against axial movement in said housing, a spindle extending through said bushing and housing and moveable axially therein, one end of said spindle having means for connecting with a drive shaft, a cutter mounted on said spindle and moveable transversely thereof, said cutter having a blade shaped substantially to a point to provide a narrow cutting edge, whereby to minimize the variation in cutting force when cutting with and then against the grain of the stock, means carried on the outer end of said spindle and beyond the cutter for locating a barrel in reboring position by engaging the hole to be rebored, gripping means carried by the supporting housing for engaging the barrel to hold it in position for reboring, and means controlled by said guide bushing and operable upon axial movement of the spindle toward the barrel to move the cutter blade inwardly at a constant rate relative to its rate of movement in the axial direction of the spindle to form a true circular bunghole with sides tapered inwardly at a predetermined angle.

3. Mechanism for reboring holes in barrels and other containers comprising a stationary supporting housing, a guide bushing journalled for rotational movement in said housing, means for holding said bushing against axial movement in said housing, a spindle extending through said bushing and housing and moveable axially therein, one end of said spindle having means for connecting with a drive shaft, the other end of said spindle being bifurcated, a tool holder mounted in said spindle and moveable transversely in the bifurcated portion thereof, a cutter adjustably mounted in said tool holder and extending laterally therefrom, said cutter having a blade shaped to a point to provide a narrow cutting edge, whereby to minimize the variation in cutting force when cutting with and then against the grain of the stock, a barrel locating knob carried on the outer end of said spindle and beyond the cutter for positioning a barrel by engaging the hole to be rebored, and means controlled by said guide bushing and operable upon axial movement of the spindle toward the barrel to move the cutter blade inwardly at a constant rate relative to its rate of movement in the axial direction of the spindle to form a true circular bunghole with sides tapered inwardly at a predetermined angle.

4. Mechanism for reboring holes in barrels and other containers comprising a stationary supporting housing, a guide bushing journalled for rotational movement in said housing, means for holding said bushing against axial movement in said housing, a spindle extending through said bushing and housing and moveable axially therein, one end of said spindle having means for connecting with a drive shaft, the other end of said spindle being bifurcated, a tool holder mounted in said spindle and moveable transversely in the bifurcated portion thereof, a cutter adjustably mounted in said tool holder and extending laterally therefrom, said cutter having a blade shaped to a point to provide a narrow cutting edge, whereby to minimize the variation in cutting force when cutting with and then against the grain of the stock, a barrel locating knob carried on the outer end of said spindle and beyond the cutter for positioning a barrel by engaging the hole to be rebored, and means controlled by said guide bushing and operable upon axial movement of the spindle toward the barrel to move the cutter blade inwardly at a constant rate relative to its rate of movement in the axial direction of the spindle to form a true circular bunghole with sides tapered inwardly at a predetermined angle, and a second cutter having a blade shaped to conform to the shape of the blade of the first-mentioned cutter, said second cutter being carried on the tool holder in a position to cut the hole formed by the first blade to a larger diameter and to the same angle of taper.

5. Mechanism for reboring holes in barrels and other containers comprising a stationary supporting housing, a guide bushing journalled for rotational movement in said housing, means for holding said bushing against axial movement in said housing, a spindle extending through said bushing and housing and moveable axially therein, one end of said spindle having means for connecting with a drive shaft, the other end of said spindle being bifurcated, a tool holder mounted in said spindle and moveable transversely in the bifurcated portion thereof, a cutter adjustably mounted in said tool holder and extending laterally therefrom, said cutter having a blade shaped to a point to provide a narrow cutting edge, whereby to minimize the variation in cutting force when cutting with and then against the grain of the stock, a barrel locating knob carried on the outer end of said spindle and beyond the cutter for positioning a barrel by engaging the hole to be rebored, and means comprising a rod extending from the tool holder into a vertically inclined slot in the guide bushing for moving the cutter blade inwardly upon axial movement of the spindle toward the barrel to form a true circular bunghole having sides tapered inwardly to the angle of incline of said slot.

References Cited in the file of this patent

UNITED STATES PATENTS

| | | |
|---|---|---|
| 1,324,459 | Maier | Dec. 9, 1919 |
| 1,486,155 | Morgan | Mar. 11, 1924 |
| 2,157,248 | Swanson | May 9, 1939 |
| 2,495,583 | Heron | Jan. 24, 1950 |
| 2,841,039 | Stastny | July 1, 1958 |

FOREIGN PATENTS

| | | |
|---|---|---|
| 113 of 1877 | Great Britain | June 10, 1877 |